Nov. 25, 1969 M. R. LORD 3,480,948

NON-LINEAR CODER

Filed Dec. 12, 1966 3 Sheets-Sheet 1

INVENTOR
MICHAEL R. LORD
BY Alfred C. Hill
AGENT

Inventor
MICHAEL R. LORD
By Alfred C. Hill
Agent

Nov. 25, 1969 M. R. LORD 3,480,948

NON-LINEAR CODER

Filed Dec. 12, 1966 3 Sheets-Sheet 3

Inventor
MICHAEL R. LORD
By Alfred C. Hill
Agent

United States Patent Office 3,480,948
Patented Nov. 25, 1969

3,480,948

NON-LINEAR CODER

Michael Robert Lord, Basildon, England, assignor to International Standard Electric Corporation, New York, N.Y., a corporation of Delaware Filed Dec. 12, 1966, Ser. No. 601,180
Claims priority, application Great Britain, Jan. 14, 1966, 1,856/66
Int. Cl. H04l *3/00;* H03k *13/00*
U.S. Cl. 340—347 10 Claims This invention relates to a coder having non-linear conversion characteristics for pulse-amplitude modulated (PAM) signals.

In pulse-code modulation (PCM) the analogue signals to be transmitted are first sampled at regular intervals giving a sequence of PAM samples of the original signal. The PAM samples are then quantised into a finite number of quantising levels and finally each level is given an appropriate digital code which is transmitted to a receiving station.

When at the receiver the digital code is converted back into the original analogue signal, a spurious signal, quantising noise, is produced. In order to reduce this noise in particular for low level signals it is known to vary the size of the quantising steps in dependence of the amplitude of the signal. Thus weak signals are quantised in smaller steps than strong signals. The desired results may be achieved either by compresing the PAM signals in a compressor having the desired non-linear characteristic followed by a linear coder or the PAM signals can be coded in a non-linear coder.

The former method in which compressors and expanders have complementary characteristics must be used suffers from several disadvantages and the latter method of non-linear coding is preferable.

According to the invention there is provided a non-linear coder for PAM signals comprising a capacitor, means for connecting said capacitor to a source of PAM signals and for charging it to a value in proportion to the amplitude of the PAM signal at a given time slot, means for discharging the capacitor at a predetermined constant rate, counting means for producing control signals regularly spaced in time, means responsive to said control signals to alter said predetermined discharge rate to a different value, means for determining the instant when the charge on said capacitor is zero, means for stopping said counter and discharging means at said instant, means for generating and reading out a code signal indicative of the setting of the counter at said instant, means for resetting said counter to zero and means for repeating the sequence of operations for the following PAM signal.

Figure 1:
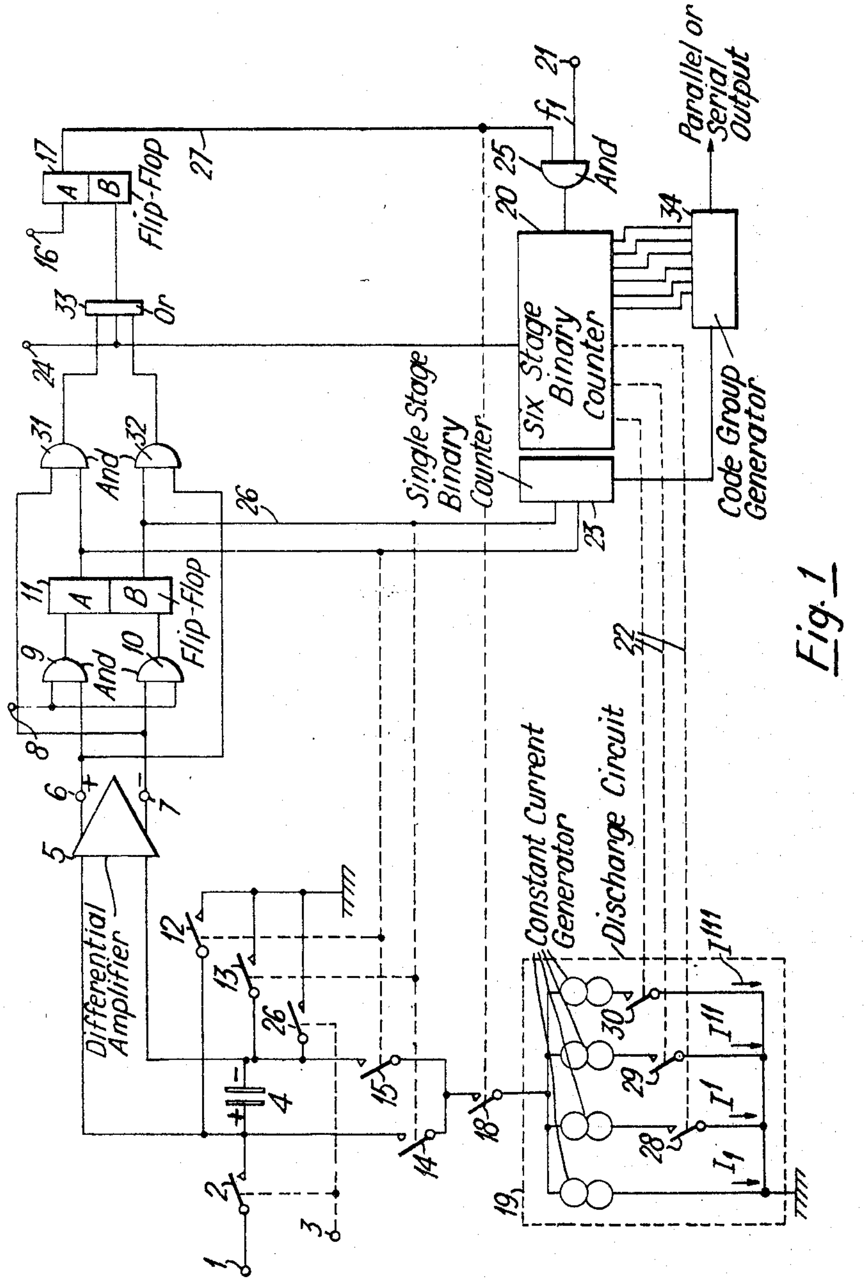
Figure 2:
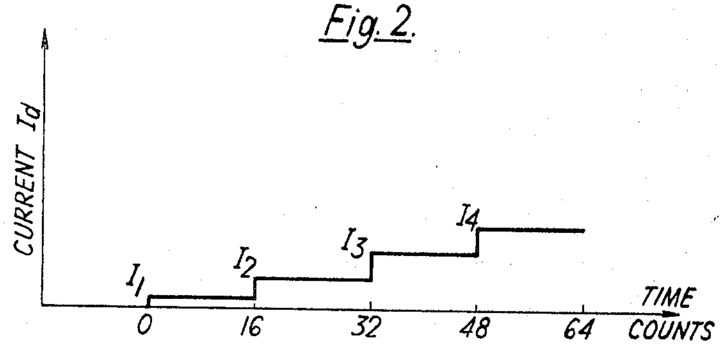
Figure 3:
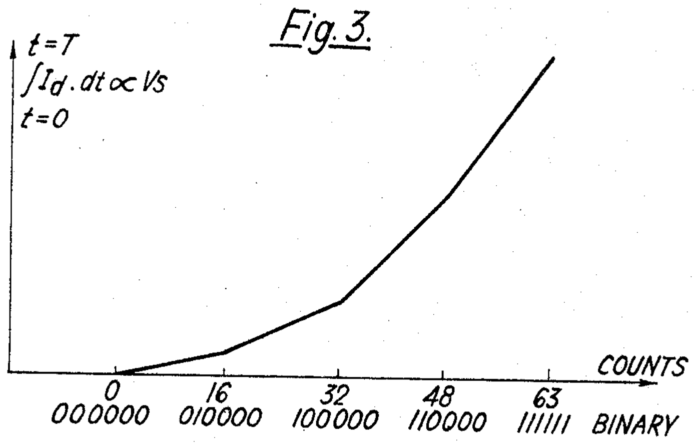
Figure 4:
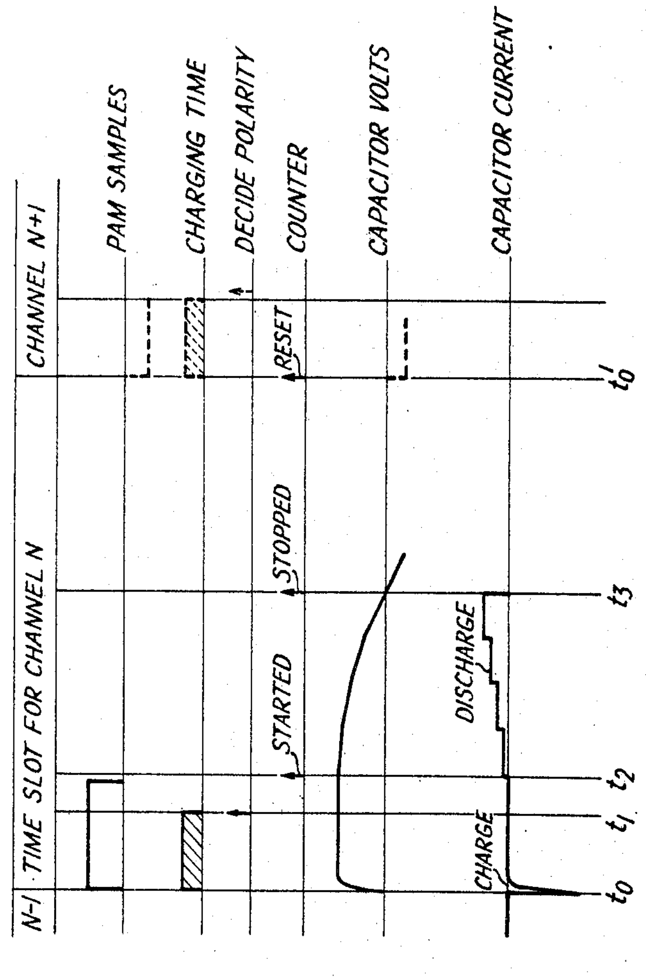

The invention will now be described with reference to the accompanying drawings in which:

FIG. 1 shows in block schematic form an embodiment of a coder according to the invention, FIG. 2 and 3 show characteristic curves, and FIG. 4 is a sequence diagram of the oepration of the coder.

In the block schematic of FIG. 1 the PAM signal samples to be coded are applied to terminal 1. These signals may for example come from channel gates of a multichannel telecommunication system. When electronic switches 2 and 26, shown for simplicity as a pair of contacts, are colsed by a control signal applied to terminal 3 the capacitor 4 is charged to a voltage equal to that of the PAM sample. A high gain, high input impedance differential amplifier 5 is connected across the capacitor and gives at its output terminals 6 and 7 signals which indicate the polarity of the charge on capacitor 4. These signals together with further control signals applied to terminal 8 operate and logic AND gates 9 and 10 which determine the setting of the bistable unit 11. The outputs of this unit actuate electronic switches 12, 13, 14 and 15 as indicated by the dashed lines.

When the polarity of the charge on capacitor 4 has been determined, a further control signal is applied to terminal 16 to trip bistable unit 17 which closes electronic switch 18 and connects capacitor 4 to the capacitor discharge circuit 19 which will be described in greater detail later. Simultaneously with the start of the capacitor discharge a binary counter 20 measures the duration of the discharge period by counting the number of cycles of an alternating current reference signal of frequency *f*1 which is applied to terminal 21. The value of the frequency *f*1 is chosen so that in the time alotted for coding the full capacity of the counter is realised. When the counter has reached a predetermined number *n* of counts, a signal is transmitted via one of the conductors 22 to the discharge circuit 19 which then alters the value of discharge curment to a different value. After a further *n* counts the discharge current is again altered, and the process is repeated until the capacitor is completely discharged and the voltage across its terminals walls to zero. At that instant the setting of the bistable unit 17 is reversed and the counter is stopped. It will be shown later that the final count A of the counter expressed in binary form is the PCM code of the PAM signal applied to terminal 1. This code is then stored in the counter in parallel form and could be converted by known means to serial form. Further digits will usually be added to the code to indicate the polarity of the PAM sample as well as synchronising signals, etc. For example the polarity of the PAM signal can be indicated by a single stage counter 23 which is operated from an output of the bistable unit 11. After the binary code has been formed a pulse is applied to terminal 24 which resets the counter 20 to zero in readiness for coding the next PAM signal. The various control or timing signals referred to above are derived in known ways from a clock pulse generator of the system and various timing arrangements.

The operation of the coder will now be described in more detail. It depends on the fact that when a capacitor which is initially charged to a voltage $V_s$ is discharged at a current $I_a$, which is kept constant, then the time T required to discharge the capacitor to zero is proportional to the voltage $V_s$. Thus if the discharge time is expressed in terms of a reading A of a binary counter or timer, A will be proportional to $$\int_{t=0}^{t=T} I_{d.dt}$$

and since the capacitor voltage is initially $V_s$ and finally zero, then A is proportional to $V_s$. If $I_d$ is maintained at a constant value from the time the discharge is started to $t=T$, then the binary number representing the discharge time T is proportional to the amplitude $V_s$ of the PAM sample and the coding is linear. If however $I_d$ is changed during the discharge period according to the value of the count, then non-linear coding will result.

As an example FIGS. 2 and 3 show the generation of a six digit non-linear code. FIG. 2 shows the variation of the discharge current $I_a$ as a function of time. It will be seen that the current is changed ever 16 counts and is made to increase progressively from value $I_1$ to values $I_2$, $I_3$ and $I_4$ at the 16th, 32nd and 48th counts. The integral of this stepped function is shown in FIG. 3 and represents the relation between the indication of the counter, or the code in binary form, at the end of the discharge period and the voltage of the PAM sample. Since in the above example only four different values of the discharge current were used, the coding characteristic of FIG. 3 comprises four rectilinear segments, one for each value of discharge current, but any required degree of approximation to a smooth curve can be achieved by reducing the number of counts for each change of current and thereby increasing the number of discrete values of the current druing discharge. Thus if the current were changed after every 8 counts, the curve of FIG. 3 would have 8 rectilinear segments.

In general it will be known how many coding digits are required in a particular case. The coding curve having the desired shape is then drawn as in FIG. 3. From this curve and the desired degree of approximation the number and magnitudes of the discharge currents are to be derived by differentiation.

In the description of the operation of the logic circuits the following conventions will be used: The "AND" and "OR" gates as well as the bistable units respond to the application of negative going pulses and when operative transmit themselves a negative going signal. A bistable unit will be said to be either in the "A" or "B" condition, depending upon which output side generates a negative going signal. In the specific case shown in FIG. 1 it will be further assumed that the required PCM code will have 7 digits, one to indicate the polarity of the PAM sample and six digits to encode its magnitude, and that for the desired approximation to the required non-linearity four different values of discharge current will be used.

In the initial condition of the circuit the six digit counter 20 is at setting "000000," gates 9, 10 and 25 are blocked and switches 2, 12, 13, 14, 15, 18 and 26 are open.

At time $t=to$ a PAM sample is applied to terminal 1, switches 2 and 26 are closed and the capacitor is charged to voltage $V_s$.

At time $t=t$, switches 2 and 26 open and isolate capacitor 4 from terminal 1. Assuming the polarity of the capacitor to be as shown in FIG. 1 output terminal 6 of the differential amplifier will be positive and terminal 7 will be negative. When at the same time a negative going timing signal is applied to terminal 8, gate 10 will open and set bistable unit 11 into B condition. A negative going signal appears on conductor 26 which controls the store 23 to indicate the polarity of the PAM signal. The signal on conductor 26 also closes switches 13 and 14 connecting the negative terminal of the capacitor to earth and its positive terminal to switch 18.

At time $t=t_2$ a negative going timing pulse is applied to terminal 16 and trips bistable unit 17 into condition A applying a negative going signal to conductor 27. This signal closes switch 18 thereby initiating the discharge of the capacitor through discharge device 19. The signal is also applied to one of the input terminals of the AND gate 25. As a result counter 20 will be pulsed during the negative half waves of reference signal $f1$ applied to terminal 21, and will count at the rate $f1$.

When at time $t2$ switch 18 is closed the discharge current $I_d$ has a value $I_1$. When the counter has reached count 16 or in binary form the count 010000 switch 28 is closed thereby increasing the discharge current to value $I_2=I_1+I'$. After further 16 counts i.e. when the counter reaches count 32, or in binary form 100000 switch 29 is closed increasing the discharge current to a value $$I_3=I_1+I'+I''$$

Finally when the counter reaches the counter 48 or in binary form count 110000, switch 30 is closed thereby increasing the discharge current to a value $$I_4=I_1+I'+I''+I'''.$$

At time $t=t_3$ the capacitor is discharged and the voltage across its terminals is zero. Both terminals 6 and 7 of the amplifier will become negative, gates 9 and 10 are blocked by the (positive) input at 8. Gate 32 will now open to send a negative pulse to OR gate 33 which sends a negative pulse to bistable 17 to "B" condition to block gate 25 to open switch 18. Similarly if the initial charge on the capacitor had the opposite polarity gate 31 would open at the end of the discharge. A negative going pulse appears at the output of the "OR" gate 33 which trips the bistable unit 17 into the B condition. As a result gate 25 is closed, counter 20 is stopped and switch 18 is opened. Finally immediately preceding the arrival of the PAM sample from channel $(N+1)$ at time $t'o$ and after the code has been read a short pulse applied to terminal 24 resets the counter to zero count.

The sequence of operation of the various parts of the circuit is shown in FIG. 4.

Each of the discharge paths in the discharge device 19 is a constant current generator arranged to drive a current in the direction indicated by the arrow. Such a device can be realised for example by connecting the capacitor to the collector circuit of a transistor operated in the grounded base mode which has a very high output impedance. Since the collector current of a transistor is a common base configuration is substantialy independent of the collector voltage constant discharge current is obtained. The value of this current can be simply set to any required value by a suitable adjustment of the current injected into the electrode.

In the discharge device shown in FIG. 1 each of the discharge paths maintains a fixed current, the total discharge current $I_d$ being varied by changing the number of paths connected in parallel. It is obvious that the control signals which are applied to the device 19 could be used to alter the value of $I_d$ not by changing the number of paths connected in parallel, but to alter the conductivity of a single path in the manner stated above, i.e. by controlling the emitter electrode current of a transistor.

A particularly convenient arrangement of the device 19 giving a square low transfer characteristic is obtained, if the number of separate discharge paths in the device is made equal to the number of stages in the counter 20. In this case each counter stage is made to control a separate one of the discharge paths, the currents in these paths being adjusted to form a binary progression. Thus the value of the current is changed after each count. In the particular case of a six stage counter the current $I_d$ will have $1+2+4+8+16+32=63$ discrete values giving an almost perfectly smooth coding characteristic.

Atlhough the above description deals with a nonlinear coder it applies equally well to a decoder in a receive terminal. In this case the various operations are carried out in reversed order, i.e. begin by feeding the received code into the binary counter and terminate with a charge on a capacitor which is the analogue equivalent of the received code.

It is to be understood that the foregoing description of specific examples of this invention is made by way of example only and is not to be considered as a limitation on its scope.

I claim:

1. A non-linear coder for pulse amplitude modulation (PAM) signals comprising:

a source of PAM signals disposed in sequential time slots;

a capacitor;

first means for coupling said source to said capacitor for charging thereof to a value proportional to the amplitude of one of said PAM signals in a given one of said time slots;

second means coupled to said capacitor for discharge thereof at a predetermined constant rate;

counting means for producing control signals at predetermined spaced time intervals;

third means coupled to said second means and said counting means responsive to said control signals to alter said predetermined dicharge rate to different values;

fourth means coupled to said capacitor and said counter for determining the instant the charge on said capacitor is zero and for stopping said counting means at said instant;

fifth means coupled to said counting means for generating a code signal indicative of the setting of said counting means at said instant; and sixth means coupled to said counting means for resetting thereof in preparation for repeating the sequence of operations for the next succeeding one of said PAM signals.

2. A coder according to claim 1, wherein
said PAM signals may have either polarity; and
said counting means includes
means coupled to said capacitor to indicate the polarity of said PAM signals.

3. A coder according to claim 1, wherein
said second means include
at least one constant current generator to discharge said capacitor at a rate independent of the magnitude of the voltage across said capacitors,

4. A coder according to claim 3, wherein
said third means includes
a plurality of constant current generators, and
means coupled to each of said plurality of current generators, each of said means being responsive to a different one of said control signals to control the number of said plurality of current generators coupled in shunt relation to said one current generator.

5. A coder according to claim 1, wherein
said PAM signals may have either polarity; and
said second means includes
a switching means coupled to said capacitor to maintain the same direction of current through said second means regardless of the polarity of said PAM signals.

6. A soder according to claim 5, wherein
said switching means includes
a differential amplifier coupled to said capacitor, and
logic circuit means coupled to said amplifier and said capacitor to connect to said second means that terminal of said capacitor having a given polarity.

7. A coder according to claim 6, wherein
said second means includes
at least one constant current generator, and
means coupled to said one generator and said logic circuit means to couple said one current generator to the appropriate terminal of said capacitor, said one current generator discharging said capacitor at a rate independent of the magnitude of the voltage across said capacitor.

8. A coder according to claim 7, wherein
said counting means includes
a single stage binary counter coupled to said logic circuit means to indicate the polarity of said PAM signals,
a source of reference frequency signal, and a plural stage binary counter producing said control signals; and
said fourth means includes
means coupled to said plural stage counter, said logic circuit means, and said source of reference frequency signal to control the starting and stopping of the counting of said reference frequency signal by said plural stage counter.

9. A coder according to claim 8, wherein
said third means includes
a plurality of constant current generators, and
switching means coupled to each of said plurality of current generators and said plural stage counter, each of said switching means being responsive to a different one of said control signals to control the number of said plurality of current generators coupled in shunt relation to said one current generator.

10. A coder according to claim 9, wherein
said fifth means is coupled to said single stage counter and said plural stage counter.

References Cited

UNITED STATES PATENTS

| | | | |
|---|---|---|---|
| 2,990,541 | 6/1961 | Gill | 324—132 X |
| 3,187,323 | 6/1965 | Flood et al. | 340—347 |
| 3,368,149 | 2/1968 | Wasserman | 340—347 X |
| 3,414,818 | 12/1968 | Reidel | 340—347 X |

MAYNARD R. WILBUR, Primary Examiner

M. K. WOLENSKY, Assistant Examiner

U.S. Cl. X.R.

325—38; 340—167; 307—228; 328—185, 151; 320—1; 332—11; 235—183